(12) United States Patent
Yamamoto et al.

(10) Patent No.: US 10,948,039 B2
(45) Date of Patent: Mar. 16, 2021

(54) BRAKING SYSTEM OF INDUSTRIAL VEHICLE

(71) Applicant: KABUSHIKI KAISHA TOYOTA JIDOSHOKKI, Kariya (JP)

(72) Inventors: Takashi Yamamoto, Aichi-ken (JP); Daisuke Maruyama, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 48 days.

(21) Appl. No.: 16/433,167

(22) Filed: Jun. 6, 2019

(65) Prior Publication Data

US 2019/0376571 A1 Dec. 12, 2019

(30) Foreign Application Priority Data

Jun. 7, 2018 (JP) .............................. JP2018-109638

(51) Int. Cl.
*F16D 65/853* (2006.01)
*F16D 65/78* (2006.01)
(Continued)

(52) U.S. Cl.
CPC ............ *F16D 65/78* (2013.01); *B60T 13/148* (2013.01); *B60T 17/221* (2013.01); *B60W 10/04* (2013.01); *B60W 10/188* (2013.01); *B60W 30/18109* (2013.01); *B60T 2260/09* (2013.01); *B60T 2270/88* (2013.01); *B60W 2300/121* (2013.01); *B60W 2510/00* (2013.01); *B60W 2510/18* (2013.01); *B60W 2710/00* (2013.01); *B60W 2710/18* (2013.01); *B60Y 2200/15* (2013.01); *B60Y 2300/18108* (2013.01); *B66F 9/07504* (2013.01); *B66F 9/07509* (2013.01); *B66F 9/07595* (2013.01); *F16D 65/853* (2013.01); *F16D 2065/782* (2013.01);
(Continued)

(58) Field of Classification Search
None
See application file for complete search history.

(56) References Cited

U.S. PATENT DOCUMENTS 6,460,500 B1 * 10/2002 Ooyama ................... F02N 7/00
123/179.3
8,216,112 B2 * 7/2012 Gibson ..................... F02N 7/00
477/156
(Continued)

FOREIGN PATENT DOCUMENTS

JP 2006-264417 A 10/2006

*Primary Examiner* — Timothy Hannon
(74) *Attorney, Agent, or Firm* — Sughrue Mion, PLLC (57) ABSTRACT

A braking system of an industrial vehicle includes an accumulator accumulating hydraulic oil, a hydraulic oil cooler cooling the hydraulic oil, an electromagnetic switch valve switching between an oil channel for the accumulator that allows supplying the hydraulic oil from a hydraulic pump to the accumulator and an oil channel for the hydraulic cooler that allows supplying the hydraulic oil from the hydraulic pump to the hydraulic oil cooler, and a controller controlling the electromagnetic switch valve to switch from the oil channel for the hydraulic cooler to the oil channel for the accumulator with timing of an increase after a drop in an engine speed when a cargo-handling operation is detected while an oil is at a setting pressure value or less and while the engine speed is at a setting engine speed or less.

3 Claims, 7 Drawing Sheets

(51) Int. Cl.
  *B60W 10/04* (2006.01)
  *B60W 10/188* (2012.01)
  *B60T 13/14* (2006.01)
  *B60T 17/22* (2006.01)
  *B60W 30/18* (2012.01)
  *B66F 9/075* (2006.01)
  *F16D 121/04* (2012.01)

(52) U.S. Cl.
  CPC .. *F16D 2065/783* (2013.01); *F16D 2065/787* (2013.01); *F16D 2121/04* (2013.01)

(56) References Cited

U.S. PATENT DOCUMENTS

| | | | |
|---|---|---|---|
| 2007/0057570 A1* | 3/2007 | Yamamoto | B60T 8/5075 303/3 |
| 2010/0175413 A1* | 7/2010 | Tsubone | B60H 1/32284 62/324.4 |
| 2017/0036900 A1* | 2/2017 | Morita | F15B 11/17 |
| 2017/0101296 A1* | 4/2017 | Morita | B60T 13/14 |
| 2018/0339683 A1* | 11/2018 | Ninoyu | B60T 7/042 |

* cited by examiner

BRAKING SYSTEM OF INDUSTRIAL VEHICLE

CROSS REFERENCE TO RELATED APPLICATION

This application claims priority to Japanese Patent Application No. 2018-109638 filed on Jun. 7, 2018, the entire disclosure of which is incorporated herein by reference.

BACKGROUND ART

The present disclosure relates to a braking system of an industrial vehicle.

An example of known technologies of braking systems for industrial vehicles is disclosed in Japanese Patent Application Publication No. 2006-264417. The braking system according to the above Publication is mounted on an industrial vehicle having an engine and a working apparatus for performing a cargo-handling operation. The braking system includes an engine-driven hydraulic pump for braking, a wheel cylinder driven by hydraulic oil discharged from the hydraulic pump, a brake operation valve disposed between the hydraulic pump and the wheel cylinder and equipped with a brake pedal, and an accumulator connected to one pipe branched from another pipe connected to the hydraulic pump. When the brake pedal is pressed to a point where the industrial vehicle is brought to a stop, the brake operation valve is shifted to feed pressure oil in the accumulator to the wheel cylinder.

The braking system as described above includes a hydraulic oil cooler for cooling the hydraulic oil to cool the brake apparatus by supplying the hydraulic oil cooled by the hydraulic oil cooler to the brake apparatus. In this case, the braking system is required to have a switch valve for switching between an oil channel to supply the hydraulic oil from the hydraulic pump to the accumulator (an oil channel for the accumulator) and an oil channel to supply the hydraulic oil from the hydraulic pump to the hydraulic oil cooler (an oil channel for the hydraulic oil cooler). However, if the switch valve is switched from the oil channel for the hydraulic oil cooler to the oil channel for the accumulator while the engine speed has dropped under the cargo-handling operation, a sudden extreme load is applied to the engine, which could cause the engine speed to fall below a threshold value of an engine stall, resulting in the engine stall.

The present disclosure is directed to providing a braking system of an industrial vehicle to prevent an engine stall when the oil channel is switched.

SUMMARY

In accordance with an aspect of the present disclosure, there is provided a braking system of an industrial vehicle having an engine and a working apparatus, which includes a braking operation section, a brake apparatus driven by hydraulic oil, a hydraulic pump driven by the engine and discharging the hydraulic oil, an accumulator accumulating the hydraulic oil discharged from the hydraulic pump, a brake valve controlling the hydraulic oil supplied from the accumulator to the brake apparatus according to operation of the braking operation section, a hydraulic oil cooler cooling the hydraulic oil discharged from the hydraulic pump, a cooling channel cooling the brake apparatus by supplying the hydraulic oil cooled by the hydraulic oil cooler to the brake apparatus, an electromagnetic switch valve switching between a first oil channel that allows supplying the hydraulic oil from the hydraulic pump to the accumulator and a second oil channel that allows supplying the hydraulic oil from the hydraulic pump to the hydraulic oil cooler, a pressure detector detecting an oil pressure in the accumulator, an engine speed detector detecting an engine speed of the engine, a detecting section detecting operation of the working apparatus, and a controlling section controlling the electromagnetic switch valve to switch from the second oil channel to the first oil channel with timing of an increase in the engine speed of the engine after a drop in the engine speed under the operation of the working apparatus, when the detecting section detects the operation of the working apparatus while the oil pressure in the accumulator detected by the pressure detector is at a setting pressure value or less and while the engine speed of the engine detected by the engine speed detector is at a setting engine speed or less.

In accordance with another aspect of the present disclosure, there is provided a braking system of an industrial vehicle having an engine and a working apparatus, which includes a braking operation section, a brake apparatus driven by hydraulic oil, a hydraulic pump driven by the engine and discharging the hydraulic oil, an accumulator accumulating the hydraulic oil discharged from the hydraulic pump, a brake valve controlling the hydraulic oil supplied from the accumulator to the brake apparatus according to operation of the braking operation section, a hydraulic oil cooler cooling the hydraulic oil discharged from the hydraulic pump, a cooling channel cooling the brake apparatus by supplying the hydraulic oil cooled by the hydraulic oil cooler to the brake apparatus, an electromagnetic switch valve switching between a first oil channel that allows supplying the hydraulic oil from the hydraulic pump to the accumulator and a second oil channel that allows supplying the hydraulic oil from the hydraulic pump to the hydraulic oil cooler, a pressure detector detecting an oil pressure in the accumulator, an engine speed detector detecting an engine speed of the engine, a detecting section detecting operation of the working apparatus, and a controlling section controlling the engine to increase the engine speed of the engine and controlling the electromagnetic switch valve to switch from the second oil channel to the first oil channel when the operation of the working apparatus is detected by the detecting section while the oil pressure in the accumulator detected by the pressure detector is at a setting pressure value or less and while the engine speed of the engine detected by the engine speed detector is at a setting engine speed or less.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

Embodiments of the present disclosure will be described in the following paragraphs with reference to the accompanying drawings. In the drawings, the identical reference numerals are assigned to identical or equivalent components to those in the previous drawings. Duplicated descriptions of the identical or equivalent configurations will be omitted or simplified.

Figure 1:
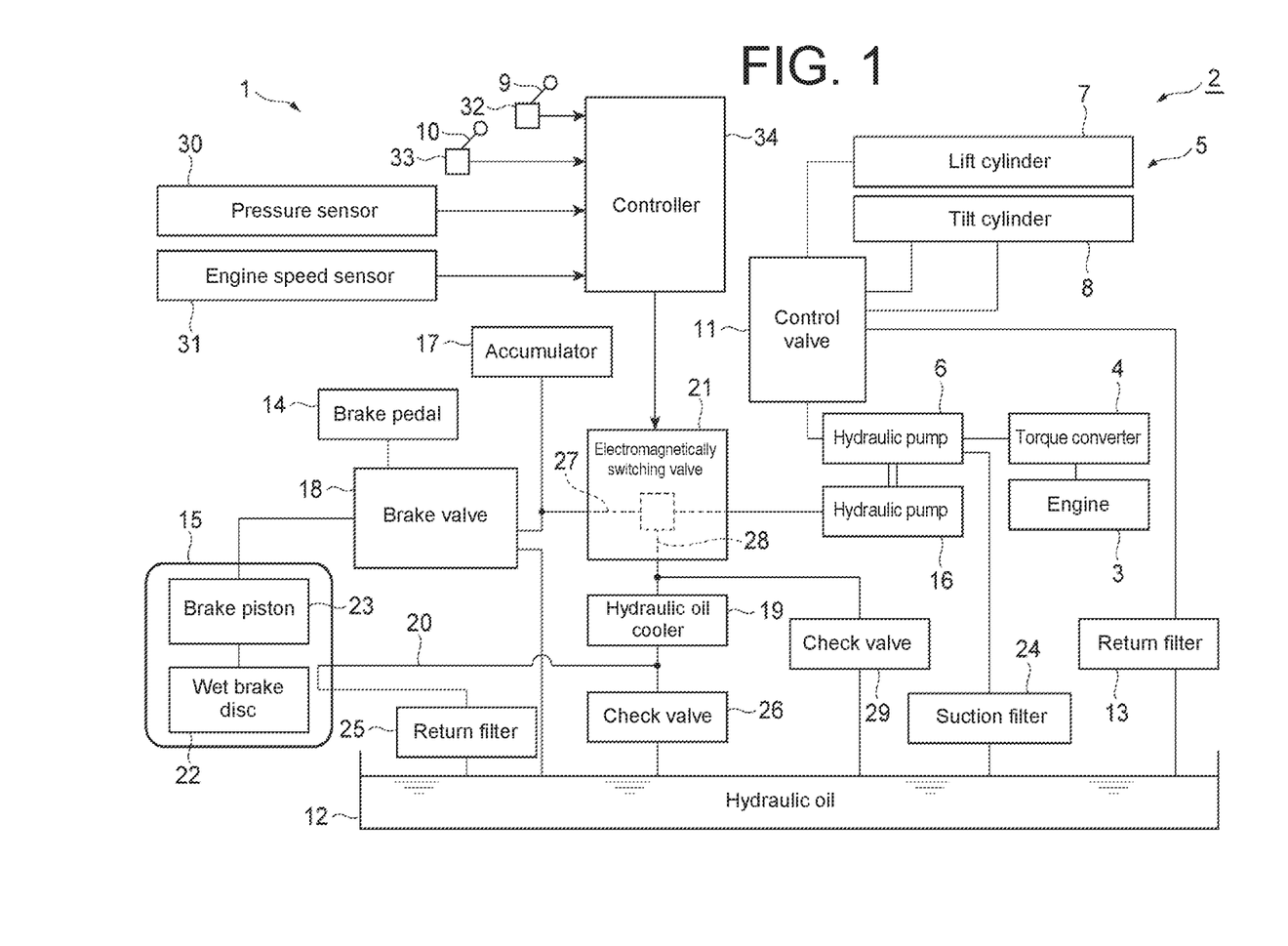
FIG. 1 is a schematic block diagram showing a hydraulic system including a braking system of an industrial vehicle according to a first embodiment of the present disclosure.

FIG. 1 is a schematic block diagram showing a hydraulic system including a braking system of an industrial vehicle according to a first embodiment of the present disclosure. A braking system 1 according to the first embodiment shown in FIG. 1 is mounted on a forklift truck 2 as an industrial vehicle. The forklift truck 2 includes an engine 3, a torque converter 4 installed to an output shaft of the engine 3, and a cargo-handling apparatus 5 (working apparatus) for performing a cargo-handling operation.

The cargo-handling apparatus 5 includes a hydraulic pump 6, a lift cylinder 7, a tilt cylinder 8, a lift operating lever 9, a tilt operating lever 10, and a control valve 11, for cargo-handling. The hydraulic pump 6 is driven by the engine 3 through the torque converter 4. The hydraulic pump 6 sucks hydraulic oil reserved in an oil tank 12 and then discharges the hydraulic oil.

The lift cylinder 7 and the tilt cylinder 8 are driven by the hydraulic oil discharged from the hydraulic pump 6. The lift cylinder 7 ascends and descends a fork (not shown). The tilt cylinder 8 inclines a mast (not shown). The fork is installed to the mast via a bracket. The lift operating lever 9 is a work operating section used by an operator so as to activate the lift cylinder 7. The tilt operating lever 10 is a work operating section used by an operator so as to activate the tilt cylinder 8.

The control valve 11 is disposed between the hydraulic pump 6 and the lift cylinder 7 or the tilt cylinder 8. The control valve 11 controls a direction and a volume of hydraulic oil flowing between the hydraulic pump 6 and the lift cylinder 7 depending on a manipulated direction and a manipulated amount of the lift operating lever 9, and controls a direction and a volume of the hydraulic oil flowing between the hydraulic pump 6 and the tilt cylinder 8 depending on a manipulated direction and a manipulated amount of the tilt operating lever 10. Note that the control valve 11 is controlled by a controller 34 that will be described below. Description regarding control of the control valve 11 is omitted in this specification. A return filter 13 is disposed in a channel connecting the control valve 11 and oil tank 12.

The braking system 1 includes a brake pedal 14, a wet brake apparatus 15, the hydraulic pump 16 for braking, an accumulator 17, a brake valve 18, a hydraulic oil cooler 19, a cooling channel 20, and an electromagnetic switch valve 21.

The brake pedal 14 is a braking operation section to be used by an operator. The wet brake apparatus 15, corresponding to a brake apparatus, includes a wet brake disc 22 for braking a wheel (not shown) of the forklift truck 2, and a brake piston 23 for operating the wet brake disc 22. The brake piston 23 is driven by hydraulic oil.

The hydraulic pump 16 is driven by the engine 3 through the torque converter 4. The hydraulic pump 16 is disposed coaxially with the hydraulic pump 6. The hydraulic pump 16 sucks the hydraulic oil reserved in an oil tank 12 through the hydraulic pump 6 and then discharges the hydraulic oil. A suction filter 24 is disposed in a flow channel between the oil tank 12 and the hydraulic pump 6 to prevent dust from entering into the hydraulic pumps 6 and 16.

The accumulator 17 accumulates the hydraulic oil discharged from the hydraulic pump 16. The brake valve 18 is disposed between the accumulator 17 and the brake piston 23. The brake valve 18 controls the hydraulic oil supplied from the accumulator 17 to the brake piston 23 according to the operation of the brake pedal 14. More specifically, the brake valve 18 controls the volume of the hydraulic oil supplied from the accumulator 17 to the brake piston 23 according to the manipulated amount of the brake pedal 14.

The hydraulic oil cooler 19 cools the hydraulic oil discharged from the hydraulic pump 16. The cooling channel 20 cools the wet brake disc 22 by supplying the hydraulic oil cooled by the hydraulic oil cooler 19 to the wet brake apparatus 15. The cooling channel 20 connects the hydraulic oil cooler 19 to the oil tank 12. The hydraulic oil returns to the oil tank 12 after having cooled the wet brake disc 22. A return filter 25 is disposed in the cooling channel 20 between the wet brake apparatus 15 and the oil tank 12. A check valve 26 is disposed in a flow channel between the hydraulic oil cooler 19 and the oil tank 12.

The electromagnetic switch valve 21 is disposed between the hydraulic pump 16 and the accumulator 17 as well as between the hydraulic pump 16 and the hydraulic oil cooler 19. The electromagnetic switch valve 21 is a valve for switching between an oil channel 27 (a first oil channel) for the accumulator that allows supplying the hydraulic oil from the hydraulic pump 16 to the accumulator 17 and an oil channel 28 (a second oil channel) for the hydraulic oil cooler that allows supplying the hydraulic oil from the hydraulic pump 16 to the hydraulic oil cooler 19. A check valve 29 is disposed in a flow channel between the electromagnetic switch valve 21 and the oil tank 12.

The braking system 1 further includes a pressure sensor 30, an engine speed sensor 31, a lift detection sensor 32, a tilt detection sensor 33, and a controller 34.

The pressure sensor 30 constitutes a pressure detector detecting an oil pressure in the accumulator 17. The engine speed sensor 31 constitutes an engine speed detector detecting an engine speed of the engine 3. The lift detection sensor 32 detects the manipulated direction and the manipulated amount of the lift operating lever 9 as a manipulated state. The tilt detection sensor 33 detects the manipulated direction and the manipulated amount of the tilt operating lever 10 as a manipulated state. The lift detection sensor 32 and the tilt detection sensor 33 constitute a detecting section detecting an operation (cargo-handling operation) of the cargo-handling apparatus 5.

The controller 34 includes components such as a CPU, a RAM, a ROM, and input and output interfaces. The controller 34 constitutes a controlling section that controls the electromagnetic switch valve 21 based on values detected by the pressure sensor 30, the engine speed sensor 31, the lift detection sensor 32, and the tilt detection sensor 33.

The controller 34 controls the electromagnetic switch valve 21 to switch from the oil channel 28 for the hydraulic oil cooler to the oil channel 27 for the accumulator when the oil pressure in the accumulator 17 detected by the pressure sensor 30 is at a lower limit setting pressure value or less. The controller 34 controls the electromagnetic switch valve 21 to switch from the oil channel 27 for the accumulator to the oil channel 28 for the hydraulic oil cooler when the oil pressure in the accumulator 17 detected by the pressure sensor 30 exceeds an upper limit setting pressure value.

Figure 2:
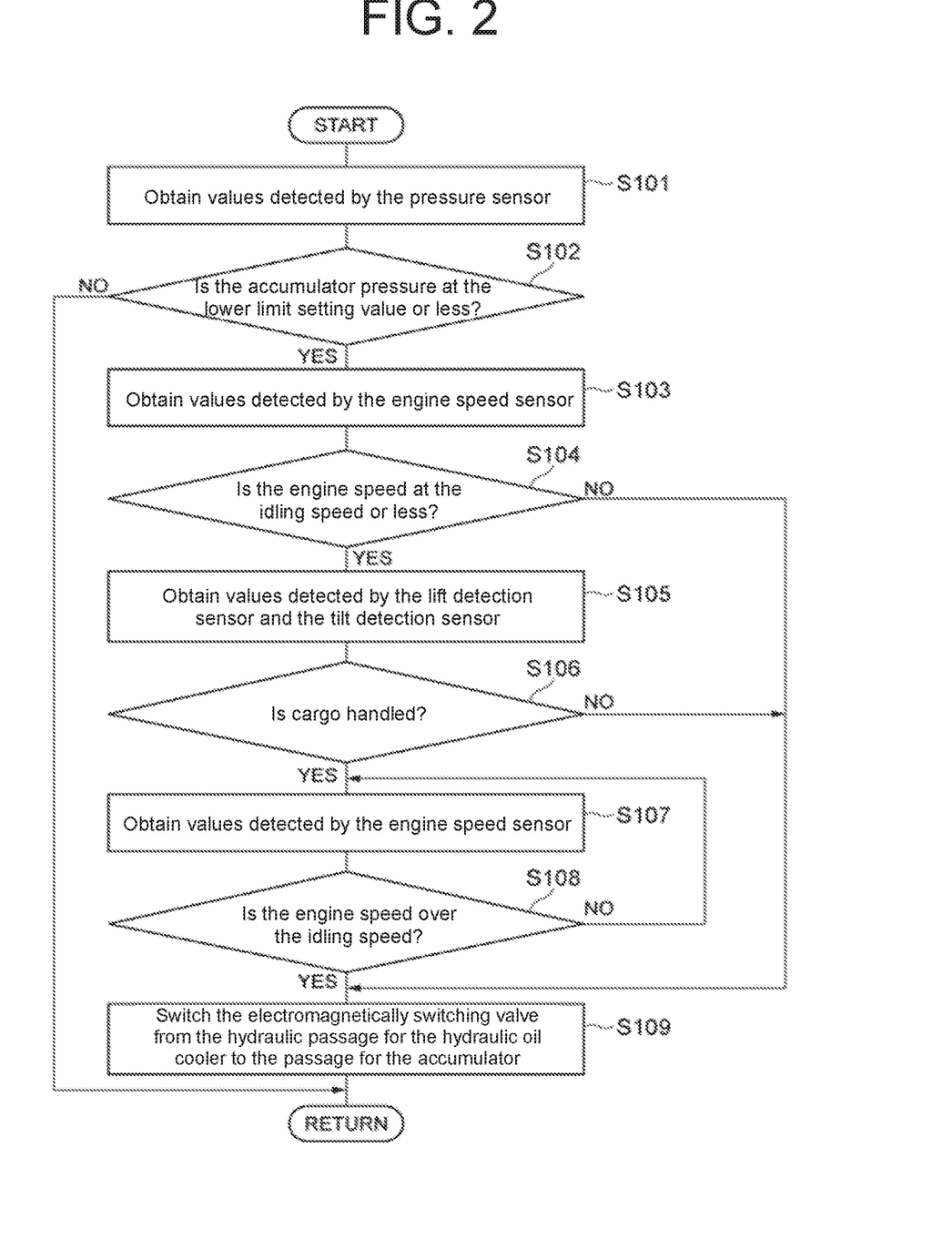
FIG. 2 is a flow diagram showing details of processing to be performed by a controller, shown in FIG. 1, which controls an electromagnetic switch valve to switch from an oil channel for a hydraulic oil cooler to an oil channel for an accumulator.

FIG. 2 is a flow diagram showing details of processing to be performed by the controller 34 controlling the electromagnetic switch valve 21 to switch from the oil channel 28 for the hydraulic oil cooler to the oil channel 27 for the accumulator.

The controller 34 shown in FIG. 2 first obtains a value detected by the pressure sensor 30 (Step S101). Then, the controller 34 determines whether or not the oil pressure in the accumulator 17 is at the lower limit setting pressure value or less based on the value detected by the pressure sensor 30 (Step S102). When the controller 34 determines that the oil pressure in the accumulator 17 is not at the lower limit setting pressure value or less, the controller 34 terminates the processing.

When the controller 34 determines that the oil pressure in the accumulator 17 is at the lower limit setting pressure value or less, the controller 34 obtains the value detected by the engine speed sensor 31 (Step S103). Then, the controller 34 determines whether or not the engine speed of the engine 3 is at an idling engine speed (a setting engine speed) or less based on the value detected by the engine speed sensor 31 (Step S104).

When the controller 34 determines that the engine speed of the engine 3 is at the idling engine speed or less, the controller 34 obtains values detected by the lift detection sensor 32 and the tilt detection sensor 33 (Step S105). Then, the controller 34 determines whether or not the cargo-handling operation is executed based on the values detected by the lift detection sensor 32 and the tilt detection sensor 33 (Step S106). The cargo-handling operation mentioned in this case refers to an ascending movement of the lift cylinder 7 or a backward tilting movement of the tilt cylinder 8.

When the controller 34 determines that the cargo-handling operation is executed, the controller 34 obtains a value detected by the engine speed sensor 31 (Step S107). Then, the controller 34 determines whether or not the engine speed of the engine 3 is increased to over the idling engine speed after having dropped under the cargo-handling operation (see FIG. 3), based on the value detected by the engine speed sensor 31 (Step S108). When the controller 34 determines that the engine speed of the engine 3 does not exceed the idling engine speed, the controller 34 executes Steps S107 and S108 again.

When the controller 34 determines that the engine speed of the engine 3 is increased to over the idling engine speed after having dropped under the cargo-handling operation, the controller 34 controls the electromagnetic switch valve 21 to switch from the oil channel 28 for the hydraulic oil cooler to the oil channel 27 for the accumulator (Step S109).

When the controller 34 determines that the engine speed of the engine 3 is at the idling engine speed or less in Step S104, the controller 34 controls the electromagnetic switch valve 21 to switch from the oil channel 28 for the hydraulic oil cooler to the oil channel 27 for the accumulator, without executing Steps S105 to S108 (Step S109). When the controller 34 determines that the cargo-handling operation is not performed in Step S106, the controller 34 controls the electromagnetic switch valve 21 to switch from the oil channel 28 for the hydraulic oil cooler to the oil channel 27 for the accumulator, without executing Steps S107 and S108 (Step S109).

In this way, in a case where the engine speed of the engine 3 exceeds the idling engine speed when the oil pressure in the accumulator 17 is at the lower limit setting pressure value or less, the electromagnetic switch valve 21 is immediately switched from the oil channel 28 for the hydraulic oil cooler to the oil channel 27 for the accumulator. However, even in a case where the engine speed of the engine 3 is at the idling engine speed or less when the oil pressure in the accumulator 17 is at the lower limit setting pressure value or less, if the cargo-handling operation is not performed, the electromagnetic switch valve 21 is immediately switched from the oil channel 28 for the hydraulic oil cooler to the oil channel 27 for the accumulator.

Figure 3:
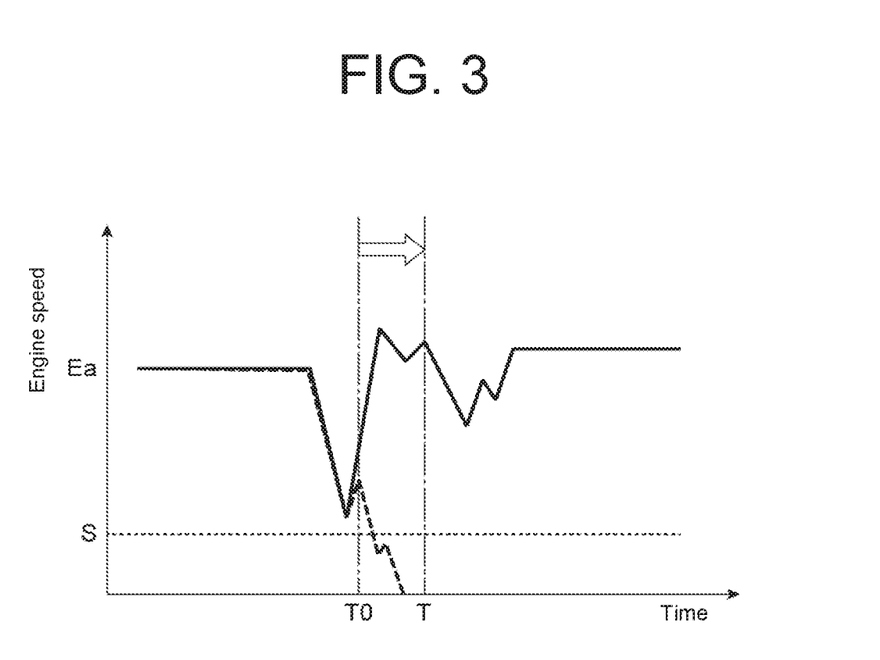
FIG. 3 is a graph showing an example of engine speed changes over time when the processing shown in FIG. 2 is performed.

On the other hand, in a case where the oil pressure in the accumulator 17 is at the lower limit setting pressure value or less and where the engine speed of the engine 3 is at the idling engine speed or less, if the cargo-handling operation is performed, the electromagnetic switch valve 21 is switched from the oil channel 28 for the hydraulic oil cooler to the oil channel 27 for the accumulator with timing T at which the engine speed of the engine 3 is increased to exceed an idling engine speed Ea after having dropped under the cargo-handling operation, as shown in FIG. 3. Note that the timing T at which the electromagnetic switch valve 21 switches the oil channel is a point, for example, at which approximately a second passes after the cargo-handling operation is performed. The timing T at which the electromagnetic switch valve 21 switches the oil channel may be a point at which the engine speed of the engine 3 exceeds the idling engine speed Ea, or at which the engine speed of the engine 3 reaches the idling engine speed Ea.

In this way, when the oil pressure in the accumulator 17 is at the lower limit setting pressure value or less, the electromagnetic switch valve 21 is switched from the oil channel 28 for the hydraulic oil cooler to the oil channel 27 for the accumulator. Then, the hydraulic oil from the hydraulic pump 16 is supplied to the accumulator 17 through the electromagnetic switch valve 21 so as to be accumulated into the accumulator 17.

When accumulation of the hydraulic oil into the accumulator 17 is completed, the oil pressure in the accumulator 17 is increased to the upper limit setting pressure value, and thus the electromagnetic switch valve 21 is switched from the oil channel 27 for the accumulator to the oil channel 28 for hydraulic oil cooler. Then, the hydraulic oil from the hydraulic pump 16 is supplied to the hydraulic oil cooler 19 through the electromagnetic switch valve 21.

When the brake pedal 14 is pressed, the brake valve 18 is opened and thus the hydraulic oil accumulated in the accumulator 17 is supplied to the brake piston 23, and then the wet brake disc 22 is activated. The hydraulic oil cooled by the hydraulic oil cooler 19 flows through the cooling channel 20 to be supplied to the wet brake apparatus 15 to cool the wet brake disc 22.

When the wet brake apparatus 15 is used, the hydraulic oil accumulated in the accumulator 17 is consumed, and thus the oil pressure in the accumulator 17 decreases. When the oil pressure in the accumulator 17 is decreased to the lower limit setting pressure value, the electromagnetic switch valve 21 is switched from the oil channel 28 for the hydraulic oil cooler to the oil channel 27 for accumulator, and then the hydraulic oil is accumulated in the accumulator 17 again.

Figure 4A:
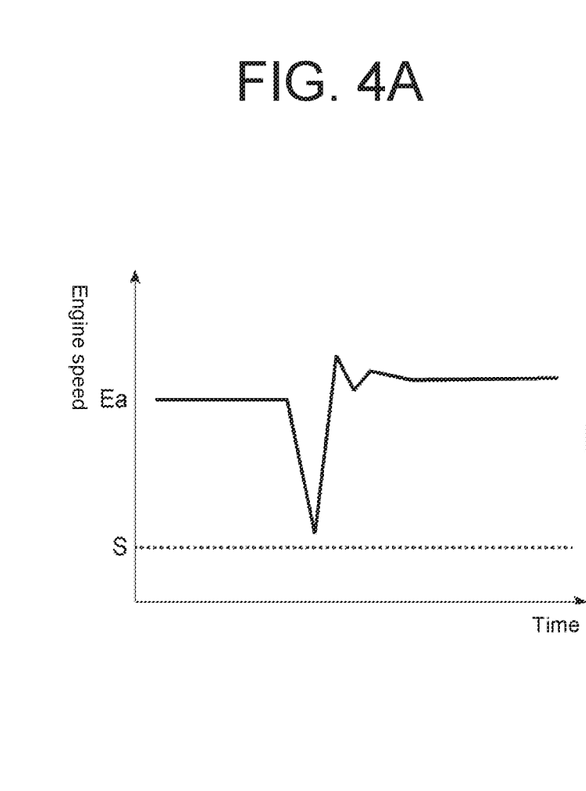
FIGS. 4A and 4B are graphs showing an example of engine speed changes over time when the processing shown in FIG. 2 is not performed.
Figure 4B:
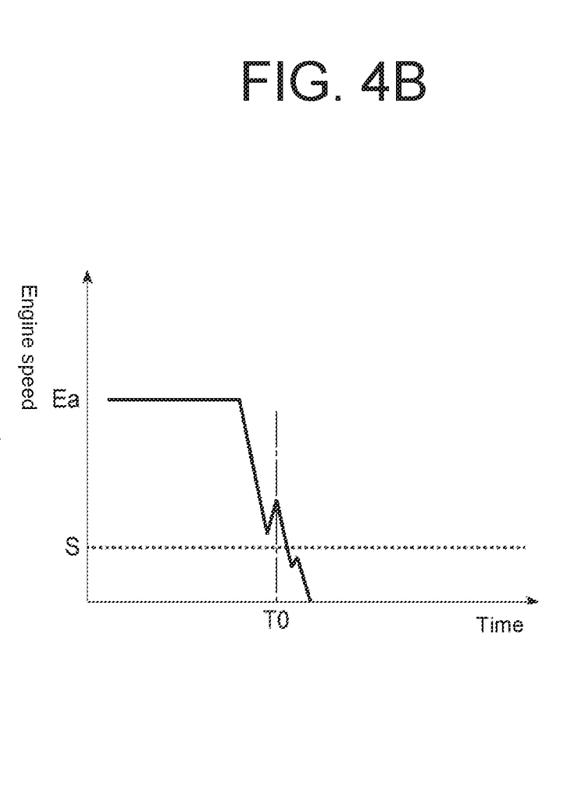

If the cargo-handling operation such as the ascending movement of the lift cylinder 7 or the backward tilting movement of the tilt cylinder 8 is performed while the engine 3 runs at idle, the engine speed of the engine 3 temporarily drops from the idling engine speed Ea as shown in FIG. 4A. In this case, as shown in FIG. 4B, if the electromagnetic switch valve 21 is switched from the oil channel 28 for hydraulic oil cooler to the oil channel 27 for accumulator with timing T0 at which the engine speed of the engine 3 has dropped under the cargo-handling operation, a high oil pressure is applied to the hydraulic pump 16, which causes a sudden extreme load to be applied to the engine 3. Owing to this, the engine speed of the engine 3 falls below a threshold value S of engine stall, causing the engine to be stalled.

By taking such a failure into consideration, according to the first embodiment of the present disclosure, when the cargo-handling operation is detected while the oil pressure in the accumulator 17 is at the setting pressure value or less and the engine speed of the engine 3 is at the idling engine speed or less, timing to switch the electromagnetic switch valve 21 from the oil channel 28 for the hydraulic oil cooler to the oil channel 27 for the accumulator is delayed as shown in FIG. 3. In particular, the electromagnetic switch valve 21 is controlled to switch from the oil channel 28 for hydraulic oil cooler to the oil channel 27 for accumulator with the timing T at which the engine speed of the engine 3 is increased after having dropped under the cargo-handling operation. Therefore, the engine speed of the engine 3 has already been increased when the electromagnetic switch valve 21 switches from the oil channel 28 for hydraulic oil cooler to the oil channel 27 for accumulator. This prevents the engine speed of the engine 3 from falling below the threshold value S of engine stall so as to prevent the engine from stalling.

According to the first embodiment of the present disclosure, the electromagnetic switch valve 21 is switched from the oil channel 28 for the hydraulic oil cooler to the oil channel 27 for the accumulator with timing at which the engine speed of the engine 3 is increased to exceed the idling engine speed after having dropped under the cargo-handling operation. This surely prevents the engine from stalling.

According to the first embodiment of the present disclosure, the manipulated states of the lift operating lever 9 and the tilt operating lever 10 are detected; the cargo-handling operation is detected with a simple configuration.

According to the first embodiment of the present disclosure, the electromagnetic switch valve 21 is switched from the oil channel 28 for the hydraulic oil cooler to the oil channel 27 for the accumulator with timing at which the engine speed of the engine 3 is increased to exceed the idling engine speed after having dropped under the cargo-handling operation. However, the scope of the present disclosure is not limited to the first embodiment described above. For example, the electromagnetic switch valve 21 may be switched from the oil channel 28 for the hydraulic oil cooler to the oil channel 27 for the accumulator with timing at which the engine speed of the engine 3 is increased to around 50% to 80% of the idling engine speed after having dropped under the cargo-handling operation.

Figure 5:
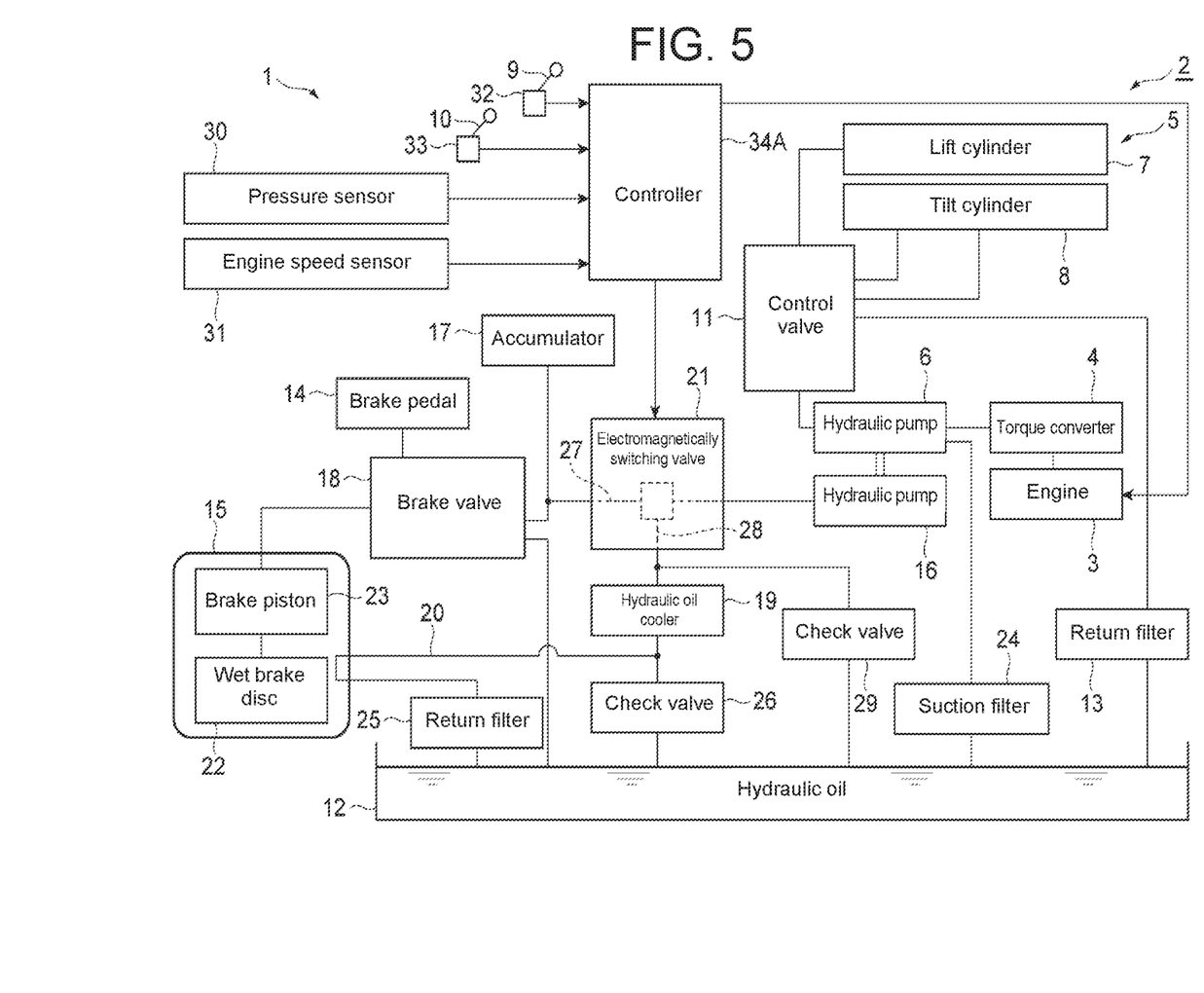
FIG. 5 is a schematic block diagram showing a hydraulic system including a braking system of an industrial vehicle according to a second embodiment of the present disclosure.

FIG. 5 is a schematic block diagram showing a hydraulic system including a braking system of an industrial vehicle according to a second embodiment of the present disclosure. A braking system 1 according to the second embodiment shown in FIG. 5 uses a controller 34A instead of the controller 34 of the first embodiment described above. The controller 34A constitutes a controlling section that controls an engine 3 and an electromagnetic switch valve 21 based on values detected by a pressure sensor 30, an engine speed sensor 31, a lift detection sensor 32, and a tilt detection sensor 33.

Figure 6:
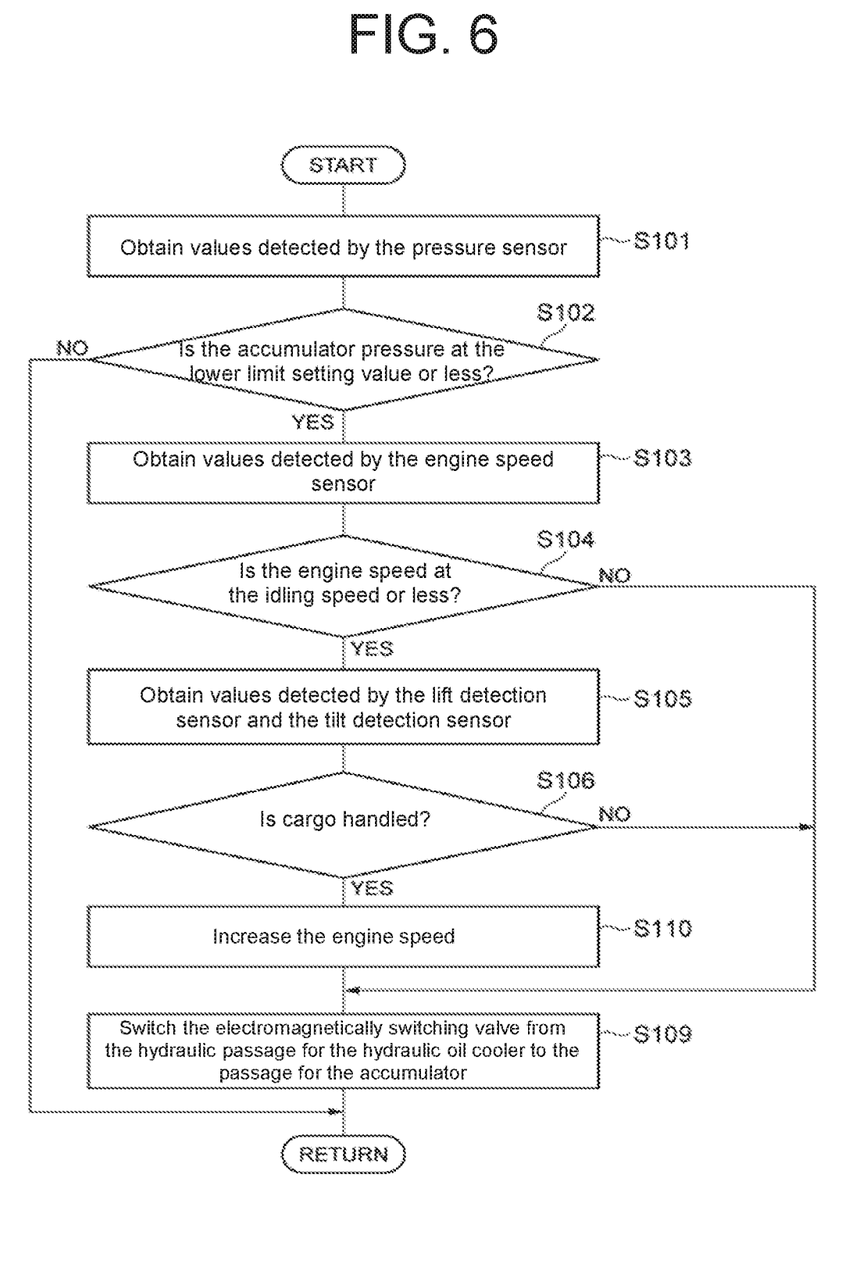
FIG. 6 is a flow diagram showing details of processing to be performed by a controller, shown in FIG. 5, which controls an electromagnetic switch valve to switch from an oil channel for a hydraulic oil cooler to an oil channel for an accumulator.

FIG. 6 is a flow diagram showing details of processing to be performed by the controller 34A for controlling the electromagnetic switch valve 21 to switch from an oil channel 28 for the hydraulic oil cooler to an oil channel 27 for the accumulator.

In FIG. 6, the controller 34A executes Steps S101 to S106, like the flow diagram shown in FIG. 2. When the controller 34A determines that a cargo-handling operation is performed in Step S106, the engine 3 is controlled to temporarily increase the engine speed thereof (Step S110).

At this time, the controller 34A determines an engine speed command to temporarily increase the engine speed of the engine 3 based on the manipulated amount of a lift operating lever 9 detected by the lift detection sensor 32 or the manipulated amount of a tilt operating lever 10 detected by the tilt detection sensor 33 so as to control the engine 3 according to the above engine speed command. Specifically, the controller 34A sets a higher engine speed command with a larger manipulated amount of the lift operating lever 9 or the tilt operating lever 10. The amount of time to increase the engine speed of the engine 3 is, for example, only a few seconds.

Then, the controller 34A controls the electromagnetic switch valve 21 to switch from the oil channel 28 for the hydraulic oil cooler to the oil channel 27 for the accumulator (Step S109).

Figure 7:
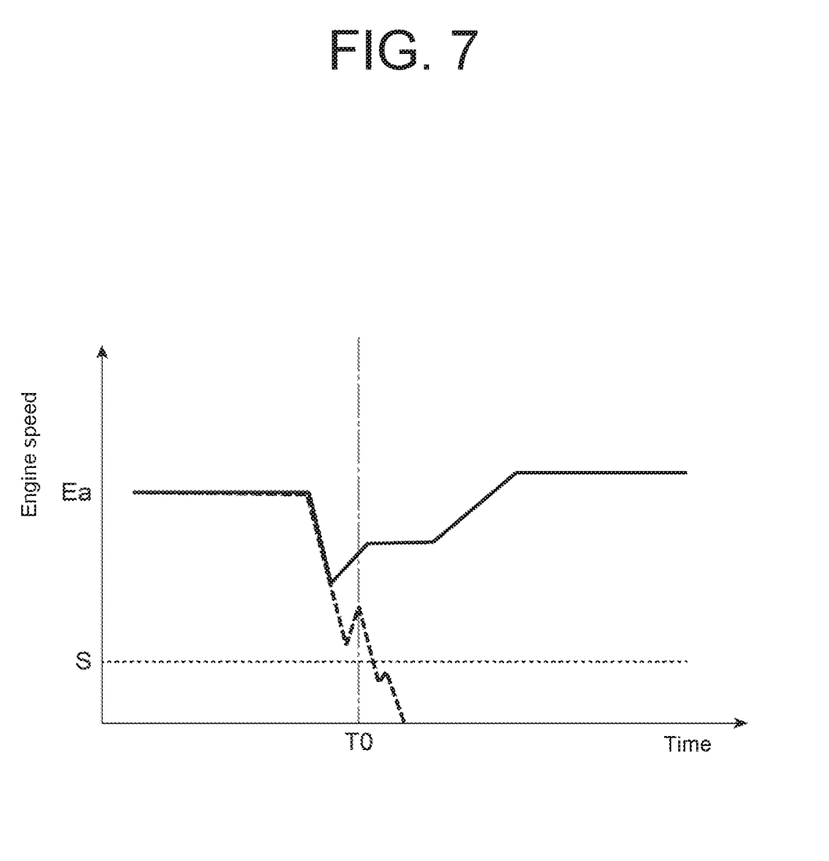
FIG. 7 is a graph showing an example of engine speed changes over time when the processing shown in FIG. 5 is performed.

In this way, according to the second embodiment of the present disclosure, when the cargo-handling operation is detected while the oil pressure in the accumulator 17 is at the setting pressure value or less and the engine speed of the engine 3 is at the idling engine speed or less, the engine 3 is controlled to increase the engine speed thereof and the electromagnetic switch valve 21 is controlled to switch from the oil channel 28 for the hydraulic oil cooler to the oil channel 27 for the accumulator. Therefore, as shown in FIG. 7, when the electromagnetic switch valve 21 switches from the oil channel 28 for hydraulic oil cooler to the oil channel 27 for the accumulator, (that is, timing T0 shown in FIG. 7), the engine speed of the engine 3 is increased. This prevents the engine speed of the engine 3 from falling below the threshold value S of engine stall so as to prevent the engine from stalling.

According to the second embodiment of the present disclosure, the engine speed command is determined to increase the engine speed of the engine 3 based on the manipulated amount of the lift operating lever 9 or the tilt operating lever 10, and then the engine 3 is controlled based on the engine speed command, so that an appropriate engine speed of the engine 3 is obtained according to the manipulated amount of the lift operating lever 9 or the tilt operating lever 10.

According to the second embodiment of the present disclosure, the engine 3 is controlled to temporarily increase the engine speed thereof when the cargo-handling operation is detected, and thus, the adverse effect on the fuel consumption is limited.

The second embodiment described herein is configured to control the engine 3 to increase the engine speed temporarily. However, the scope of the present disclosure is not limited to the above configuration. The engine speed of the engine 3 may be increased continuously (e.g. for tens of seconds or several minutes).

The scope of the present disclosure is not limited to the embodiments described above.

According to the embodiments of the present disclosure, when the cargo-handling operation is performed while the engine speed of the engine 3 is at the idling engine speed or less, the timing to switch the electromagnetic switch valve 21 from the oil channel 28 for the hydraulic oil cooler to the oil channel 27 for the accumulator is delayed or the engine speed of the engine 3 is increased with timing at which the electromagnetic switch valve 21 is switched from the oil channel 28 for the hydraulic oil cooler to the oil channel 27 for the accumulator. However, the scope of the present disclosure is not limited to the embodiments described above. For example, in a case where there is a risk that the engine may be stalled even though the engine speed of the engine 3 exceeds the idling engine speed, if the cargo-handling operation is performed while the engine speed of the engine 3 is at a setting engine speed exceeding the idling engine speed or less, the timing to switch the electromagnetic switch valve 21 from the oil channel 28 for the hydraulic oil cooler to the oil channel 27 for the accumulator may be delayed or the engine speed of the engine 3 may be increased with the timing at which the electromagnetic switch valve 21 is switched from the oil channel 28 for the hydraulic oil cooler to the oil channel 27 for the accumulator.

The braking system 1 according to the embodiments described herein is mounted on the forklift truck 2. However, the present disclosure may apply to an industrial vehicle other than forklift trucks as far as an engine as a driving source and a working apparatus are provided.

What is claimed is:

1. A braking system of an industrial vehicle having an engine and a working apparatus, the braking system comprising:
    a braking operation section;
    a brake apparatus driven by hydraulic oil;
    a hydraulic pump driven by the engine and discharging the hydraulic oil;
    an accumulator accumulating the hydraulic oil discharged from the hydraulic pump;
    a brake valve controlling the hydraulic oil supplied from the accumulator to the brake apparatus according to operation of the braking operation section;
    a hydraulic oil cooler cooling the hydraulic oil discharged from the hydraulic pump;
    a cooling channel cooling the brake apparatus by supplying the hydraulic oil cooled by the hydraulic oil cooler to the brake apparatus;
    an electromagnetic switch valve switching between a first oil channel that allows supplying the hydraulic oil from the hydraulic pump to the accumulator and a second oil channel that allows supplying the hydraulic oil from the hydraulic pump to the hydraulic oil cooler;
    a pressure detector detecting an oil pressure in the accumulator;
    an engine speed detector detecting an engine speed of the engine;
    a detecting section detecting operation of the working apparatus; and
    a controlling section controlling the electromagnetic switch valve to switch from the second oil channel to the first oil channel with timing of an increase in the engine speed of the engine after a drop in the engine speed under the operation of the working apparatus, when the detecting section detects the operation of the working apparatus while the oil pressure in the accumulator detected by the pressure detector is at a setting pressure value or less and while the engine speed of the engine detected by the engine speed detector is at a setting engine speed or less.

2. The braking system according to claim 1, wherein
the setting engine speed is an idling engine speed, and
the controlling section controls the electromagnetic switch valve to switch from the second oil channel to the first oil channel with timing at which the engine speed of the engine is increased to exceed the idling engine speed after the drop in the engine speed under the operation of the working apparatus.

3. The braking system according to claim 1, wherein
the industrial vehicle includes a work operating section activating the working apparatus, and
the detecting section detects the operation of the working apparatus by detecting a manipulated state of the work operating section.

* * * * *